US011288541B1

(12) United States Patent
Rossi et al.

(10) Patent No.: US 11,288,541 B1
(45) Date of Patent: Mar. 29, 2022

(54) GRAPH-BASED CONFIGURATION OF USER INTERFACE FOR SELECTION OF FEATURES IN VISUALIZATION APPLICATIONS

(71) Applicant: Adobe Inc., San Jose, CA (US)

(72) Inventors: Ryan Rossi, San Jose, CA (US); Vasanthi Holtcamp, San Jose, CA (US); Tak Yeon Lee, Cupertino, CA (US); Sana Lee, Brea, CA (US); Nathan Ross, San Jose, CA (US); John Anderson, American Fort, UT (US); Fan Du, San Jose, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 22 days.

(21) Appl. No.: 17/015,495

(22) Filed: Sep. 9, 2020

(51) Int. Cl.
*G06K 9/62* (2006.01)
*G06F 17/18* (2006.01)
*G06F 3/0482* (2013.01)

(52) U.S. Cl.
CPC ........... *G06K 9/623* (2013.01); *G06F 3/0482* (2013.01); *G06F 17/18* (2013.01); *G06K 9/6215* (2013.01)

(58) Field of Classification Search
CPC .... G06K 9/623; G06K 9/6215; G06F 3/0482; G06F 17/18
USPC ........................................................ 715/765
See application file for complete search history.

(56) References Cited

U.S. PATENT DOCUMENTS

| | | | | |
|---|---|---|---|---|
| 2006/0026145 | A1* | 2/2006 | Beringer | G06F 3/0482 |
| 2009/0100321 | A1* | 4/2009 | Singh | G06F 3/0482 |
| | | | | 715/205 |
| 2013/0198156 | A1* | 8/2013 | Penikis | G06F 16/44 |
| | | | | 707/705 |
| 2015/0082242 | A1* | 3/2015 | Antipa | G06F 3/0482 |
| | | | | 715/811 |
| 2015/0309565 | A1* | 10/2015 | Ben | G06F 3/04845 |
| | | | | 715/776 |
| 2016/0098463 | A1* | 4/2016 | Burke | G06F 3/04842 |
| | | | | 715/771 |
| 2017/0153771 | A1* | 6/2017 | Chu | G06F 3/04847 |
| 2018/0129993 | A1* | 5/2018 | Fowler | G06Q 10/109 |
| 2019/0065615 | A1* | 2/2019 | Room | G06F 16/90348 |
| 2020/0081593 | A1* | 3/2020 | Nasson | G06F 3/0486 |
| 2020/0409729 | A1* | 12/2020 | Al Majid | G06F 3/04817 |

(Continued)

*Primary Examiner* — William D Titcomb
(74) *Attorney, Agent, or Firm* — Kilpatrick Townsend & Stockton LLP

(57) ABSTRACT

This disclosure involves generating, from a user data set, a ranked list of recommended secondary variables in a user interface field similar to primary variable selected in another user interface field. A system receives a data set having variables and corresponding sets of values. The data visualization system determines a feature vector for each variable based on statistics of a corresponding values set. The system generates a variable similarity graph having nodes representing variables and links representing degrees of similarity between feature vectors of variables. The system receives a selection of a first variable via a first field of the user interface, detects a selection of a second field, and identifies a relationship between the first field and the second field. The system generates a contextual menu of recommended secondary variables for use with the selected first variable based on similarity value of the links in the variable similarity graph.

20 Claims, 8 Drawing Sheets

(56) References Cited

U.S. PATENT DOCUMENTS

2020/0410002 A1* 12/2020 Rossi .................. G06F 16/9024
2021/0224857 A1* 7/2021 Sinha .................. G06F 16/2264

* cited by examiner

200

Updating a user interface to include a contextual menu of recommended secondary variables that are relevant to another variable selected in the user interface

210

Receiving a user data set having variables and corresponding sets of values

220

Computing feature vectors that represent sets of values of different variables and that are used to generate a contextual menu

230

Generating a variable similarity graph that indicates degrees of similarity between feature vectors used to generate the contextual menu

240

Generating, for display on a presentation device, a user interface that includes a first field for selection of a primary variable of the user data set and a second field for selection of a secondary variable of the user data set

250

Receiving a selection of a first variable via a first field of the user interface

260

Detecting a selection of the second field of the user interface

270

Identifying a relationship between the first field and the second field

280

Generating a contextual menu of recommended secondary variables

290

Updating, for display on the presentation device, the user interface to include the contextual menu

Computing feature vectors that represent sets of values of different variables and that are used to generate the contextual menu of FIGS. 1 and 2

310

Determining primary statistics of values set

320

Determining secondary statistics based on primary statistics of the values set

330

Generating feature vector based on primary and secondary statistics

*Fig. 2, block 230*

Generating a variable similarity graph that indicates degrees of similarity between feature vectors and that is used to generate the contextual menu from FIG. 2

410

Generating a variable similarity graph for the user data set with nodes representing feature vectors of respective variables

420

Determining link similarity values between pairs of nodes in the variable similarity graph representing feature vectors corresponding to each respective pair of nodes

430

Modifying the link similarity values in the variable similarity graph based on graph training data including user selection history

440

Modifying the link similarity values in the variable similarity graph based on graph training data including historical pairing data

450

Excluding, for each node, link similarity values associated with other nodes violating a rule set associated with the respective node

460

Storing the variable similarity graph comprising remaining modified link similarity values

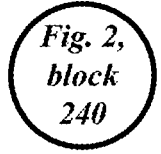

Fig. 2, block 240

*Fig. 4*

Variable similarity graph 500

Generating a contextual menu of recommended secondary variables

610
Retrieving the linked similarity values corresponding to a node associated with a selected first variable from the weighted similarity graph 620
Excluding a link similarity value corresponding to node associated with a first secondary variable in response to determining that weighted link is below a threshold similarity value 630
Ranking the non-excluded similarity values, the ranked list including a link similarity value corresponding to a node associated with a second secondary variable 640
Generating a contextual menu of recommended secondary variable identifiers according to ranking of non-excluded weighted links for selection via a second field of user interface

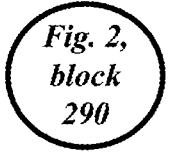

*Fig. 2, block 290*

*Fig. 6*

US 11,288,541 B1

GRAPH-BASED CONFIGURATION OF USER INTERFACE FOR SELECTION OF FEATURES IN VISUALIZATION APPLICATIONS

TECHNICAL FIELD

This disclosure generally relates to user interface tools in computing systems for creating visualizations. More specifically, but not by way of limitation, this disclosure relates to generating in a user interface of a visualization application a menu or other interface element that allows for more convenient selection of features from a data set, such as variables that are likely to be relevant to another variable that has been selected in the user interface.

BACKGROUND

Visualization computing systems enable users to create and manipulate data sets and also to generate visual representations of data sets. Users may interact with a user interface provided by the visualization computing system (e.g., via a mobile device) to select variables for generating visual representations of data sets, for example, by inputting a selection of variables to the user interface.

Visualization computing systems often provide graphical user interfaces that do not provide useful variable selection menus, resulting in poor functionality of the graphical user interface. For instance, conventional variable selection interfaces in dashboard applications of visualization computing systems often provide an alphabetical or numerical listing of all potential variables for selection by a user to generate visual representations (e.g., charts, images, plots) from a user-provided data set. These alphabetical or numerical listings result in a burdensome user experience of scrolling or otherwise navigating through a large list of potentially irrelevant variables to select a desired variable for each field. For example, a data set could include hundreds or thousands of variables. In this example, generating a visual representation of the data set based on variables in positions 95 and 99 on the list requires scrolling in a menu of the available variables listed in numerical (or alphabetical) order through dozens of unwanted variables to select variables 95 and 99.

SUMMARY

Certain embodiments involve generating, for a user interface of a visualization computing system, an interface element such as a menu for selecting recommended variables from a data set that are more likely to be relevant to another variable from the data set that has been selected in the user interface. For example, the data visualization system receives a data set having variables and corresponding sets of values. The data visualization system computes for each variable statistics of a corresponding set of values. The data visualization system uses these values to generate a variable similarity graph representing similarities between the different variables. The variable similarity graphs allows the data visualization system to generate in a user interface, a contextual menu of recommended variables for use with a selected variable. For instance, if the data visualization system receives a selection of a variable via a first field of the user interface and detects a selection of a second field in the user interface the data visualization system references the variable similarity graph to identify which of the variables are similar to the selected variable and to generate a contextual menu of recommended secondary variables. In the contextual menu, secondary variables with greater similarity to the selected variable are more accessible. For instance, dissimilar variables are excluded from the contextual menu or displayed less prominently in the contextual menu. The data visualization system updates for display on a user device the user interface to include the contextual menu.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts an example of a method for updating a user interface to include a contextual menu of recommended secondary variables that are relevant to another variable selected in the user interface, according to certain embodiments described in the present disclosure.

FIG. 3 depicts an example of a method of computing feature vectors that represent sets of values of different variables and that are used to generate the contextual menu of FIGS. 1 and 2, according to certain embodiments described in the present disclosure.

FIG. 4 depicts an example of a method for generating a variable similarity graph that indicates degrees of similarity between feature vectors used to generate the contextual menu from FIG. 2, according to certain embodiments described in the present disclosure.

FIG. 5 depicts an example of a variable similarity graph generated by the process of FIG. 4, according to certain embodiments described in the present disclosure.

FIG. 6 depicts an example of a method for generating the contextual menu from FIG. 2, according to certain embodiments described in the present disclosure.

DETAILED DESCRIPTION

Figure 1:
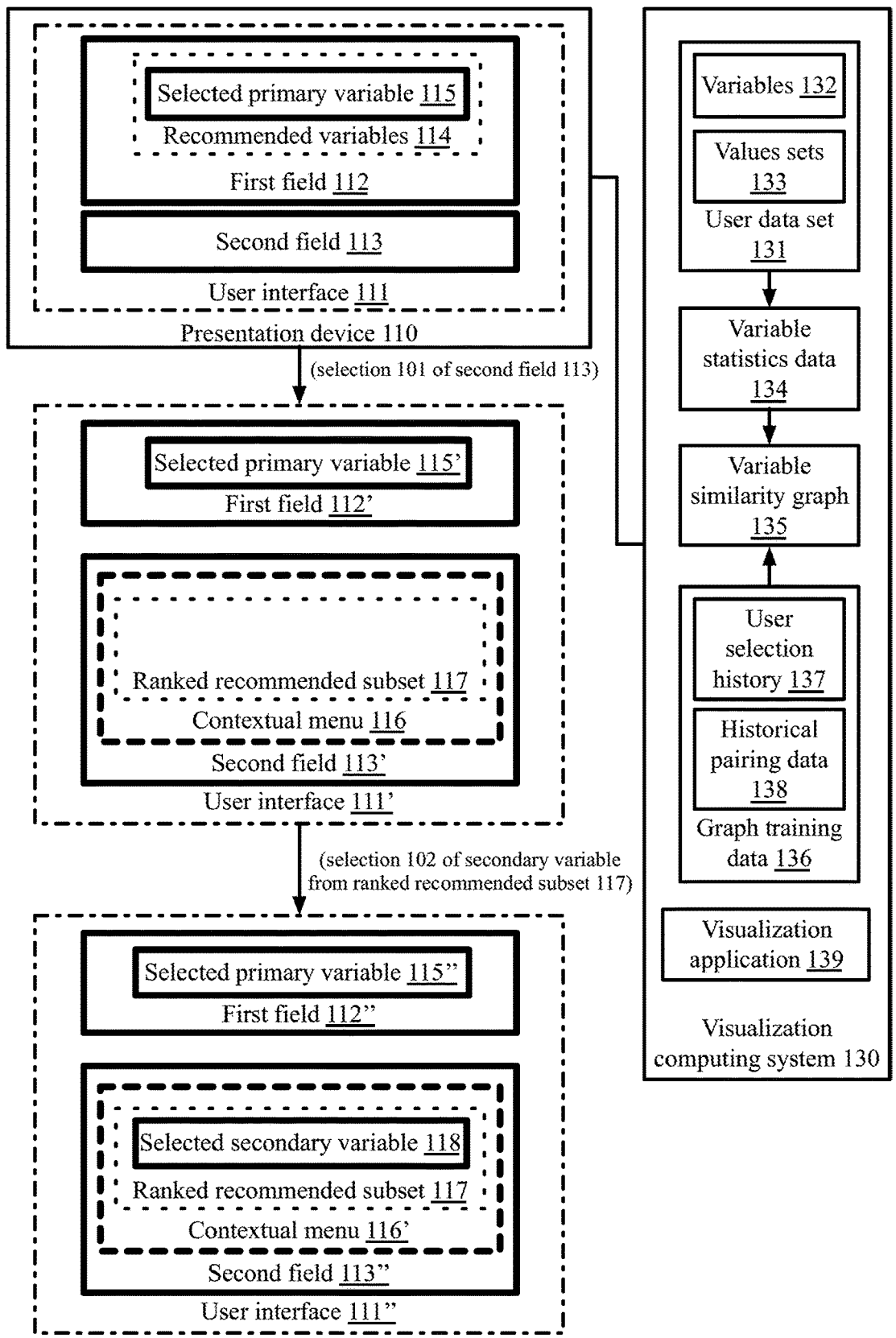
FIG. 1 depicts an example of a computing environment for generating, in a user interface of a visualization application, a contextual menu that provides more convenient access to secondary variables from a dataset that are more relevant to a selected variable from the data set, according to certain embodiments described in the present disclosure.

The present disclosure involves generating in a user interface of a visualization application a menu that allows for more conveniently selecting recommended variables from a data set that are likely to be relevant to another variable that has been selected in the user interface. As explained above, conventional visualization applications have user interfaces that merely display selectable variables in a generic alphabetical or numerical order. This results in users having to engage in burdensome navigation maneuvers such as excessive scrolling, tabbing, or otherwise navigating through selection menus to find desired variables, thereby degrading the functionality of the graphical user interface for selection of variables. Certain embodiments described herein can avoid one or more of these problems by, for example, computing feature vectors for variable of a data set, building a variable similarity graph based on the feature vectors, and using the variable similarity graph to generate of contextual menus or other user interface tools that are allow for more convenient access to interface elements for selecting more relevant variables, such as by excluding irrelevant variables from the menu or positioning more relevant variables more prominently in the menu. These embodiments can therefore improve the functionality of the user interface by decreasing the burdens on navigation to particular interface elements for selecting a desired variables in a visualization application.

The following non-limiting example is provided to introduce certain embodiments. In this example, a data visualization computing system provides data visualization services (e.g., generation of a visual representation from a user-provided data set). For instance, the data visualization computing system could include a dashboard application. The dashboard application includes tools for uploading a user data set, selecting variables from the user data set to generate a visual representation, and presenting the visual representation for further review or modification. The dashboard application receives such a user data set having variables and corresponding values sets. Values sets could include measurements of a variable or identification of a particular value from a set of variable values, with these measurements or identifications represented using scalar values, percentages, text, descriptors, symbols, or other values that indicate how a variable applies to different entities of the user data set.

Continuing with this example, the data visualization computing system generates a set of data structures, including feature vectors and a variable similarity graph, to facilitate the generation of navigation tools specific to the uploaded user data set. For instance, the dashboard application computes feature vectors that represent specific values sets for different variables of the user data set. The feature vector for a variable could be a k-dimensional embedding with a set of k elements obtained from primary and secondary statistics for the values set. In one example, the elements of a feature vector for a given variable includes values of different statistics computed from the values set for that variable, such as a mean of the values set, a median of the values set, a minimum of the values set, a maximum of the values set, a density of the values set, a number of outliers within the value set, etc. This feature vector also includes secondary statistics by applying functions such as aggregators or other transformations to other statistics of the variable's value set. The dashboard application also generates a variable similarity graph based on the feature vectors. For instance, nodes of the variable similarity graph represent variables of the user data set, and link similarity values between the nodes represent degrees of similarity between the value sets for the variables. The dashboard application computes the link similarity values by applying a similarity function (e.g., a radial basis function, a polynomial kernel function) to pairs of feature vectors computed from pairs of the variables represented by the nodes.

Continuing with this example, the dashboard application uses the variable similarity graph to generate contextual menus or other user interface tools for quickly navigating to relevant variables with the uploaded user data set. For instance, a user interface of the dashboard application includes a first field for selection of a primary variable of the user data set and a second field for selection of a secondary variable of the user data set. The dashboard application receives a selection of the first variable via the first field of the user interface, detects the selection of a second field, and identifies a relationship between the first field and the second field. For instance, if the dashboard application is being used to build a chart showing relationship between variables, the dashboard application identifies a relationship between the fields such as the first field being one axis of the graph and the second field being another axis of the chart.

In this example, the dashboard application generates, at or near the selected second field, a contextual menu of recommended secondary variables for use with the selected first variable. To do so, the dashboard application identifies nodes in the variable similarity graph that have weighted edges connecting the nodes to a node representing the first variable. More heavily weighted edges could indicate greater similarity or other measures of relevance. The dashboard applications selects, for inclusion in the contextual menu, the variables represented by the identified nodes as recommended secondary variables. The dashboard application configures the contextual menu to include interface elements for selecting these recommended secondary variables. In the contextual menu, an interface element for selecting a secondary variable with a more heavily weighted edge (i.e., a secondary variable whose data values are more similar to the data values of the selected first variable) is positioned more prominently than an interface element for selecting a secondary variable with a less heavily weighted edge. For instance, a ranked list of secondary variables could have higher ranks for more relevant secondary variables and lower ranks for less relevant secondary variables. In some cases, the dashboard application restricts the ranked list to secondary variables associated with node pairs having at least a threshold link similarity value or may shorten the ranked list by excluding secondary variables associated with node pairs having less than the threshold link similarity value.

The dashboard application updates for display on the presentation device the user interface to include the contextual menu. An example of the contextual menu is a scrollable menu that is projected from the second field in response to the user selecting the second field and that presents the ranked list of secondary variables for selection by the user of a particular secondary variable. The contextual menu allows the user to select a particular secondary variable from the contextual menu via the user interface, thereby causing the dashboard application to update the user interface to include the first field displaying the selected primary variable and the second field displaying the selected particular secondary variable. In some embodiments, the dashboard application also generates a visual representation showing a relationship between the selected primary and secondary variables for display via the user interface.

Certain embodiments provide improvements to computing systems by lessening the burden of navigation of user interfaces. Examples of burdensome user interface navigation include scrolling or tabbing through a menu with a list of all available variables in a user data set having no logical organization. Improvements that reduce this burdensome user interface navigation can be effected by generating a specific set of data structures for a given data set, such as the feature vectors and variable similarity graph described herein, and using these data structures to configure the structure of a contextual menu or other user interface tool for selecting certain variables from a user data set for inclusion in a visual representation. For instance, the feature vectors and variable similarity graph allow a computing system to assess the relevance of different variables in a particular data set to one another and to control, based on the assessed relevance, the structure of user interface elements for selecting variables within the contextual menu. Controlling the configuration of a contextual menu or other user interface tool in this manner improves the functionality of the interface by, for example, reducing the amount of scrolling or other navigation required by the user interface of a visualization application. These techniques, therefore, decrease an amount of time or effort a user spends on selecting a variable in the second field, especially in cases where the user does not already have a predetermined secondary variable in mind to use with the selected primary variable.

Example of an Operating Environment for Applying Rate Limits to Violator Tenant Systems Referring now to the drawings, FIG. 1 depicts an example of a computing environment 100 for generating, in a user interface 111 of a visualization application 139, a contextual menu 116 that provides more convenient access to secondary variables from a dataset that are more relevant to a selected variable from the data set. In this example, the computing environment 100 includes a visualization computing system 130 and a presentation device 110 that displays a succession of user interfaces 111, 111', and 111", where the user interfaces 111' and 111" are updated versions of the user interface 111. The visualization computing system 130 executes one or more software modules that support creation of visual representation from user data sets 131.

In the example depicted in FIG. 1, the visualization computing system 130 receives a user data set 131 including variables 132 and values sets 133 associated with the variables 132. Variables 132 are dimensions or other criteria by which a set of entities described in the user data set 131 are described and include numeric and/or categorical variables 132. Values sets 133 measure or otherwise provide a value or categorical label for the set of entities for associated variables 132. In an example of a data set, the set of entities include a set of cities of a country, a set of students of a class, a set of products marketed by a company, or other interesting or useful set of entities that are described using variables 132 and associated values sets 133 for each variable. A user uploads the user data set 131 to the visualization computing system 130 via a visualization application 139 executed on the visualization computing system 130.

In an example, a visualization computing system 130 receives a user data set 131 that includes variables 132 and values sets 133 associated with the variables 132 that indicate values of the variables 132 for a set of entities. An example of a user data set 131 is for four produce entities associated with a grocery store and includes the variables Produce Type and Unit Cost and the values sets {fruit, fruit, vegetable, fruit} corresponding to variable Produce Type and {0.47, 0.20, 0.01, 0.90} corresponding to variable Unit Cost. The variables in this user data set describe dimensions or other criteria of entities described in the user data set and are associated with one or more of numeric and categorical values sets. The values sets of this data set include sets of values (e.g., the Unit Cost values set) and categorical labels (e.g., the Produce Type values set) associated with a corresponding variable for the four entities described by the data set.

As shown in FIG. 1, the visualization computing system 130 determines variable statistics data 134 for each variable of the user data set 131. Variable statistics data 134 for each variable includes primary statistics describing the corresponding values set (e.g., a mean, a median, a minimum, a maximum, a density, a number of outliers) that are determined by applying statistical functions to the values set. The variable statistics data 134 for each variable further includes secondary statistics determined from the primary statistics. The visualization computing system 130 computes feature vectors from the variable statistics data 134 that represent specific values sets 133 for different variables 132 of the user data set 131. The feature vector for a variable could be a k-dimensional embedding with a set of k elements obtained from primary and secondary statistics for the values set. The visualization computing system 130 generates a variable similarity graph 135 based on the feature vectors computed from the variable statistics data 134. The variable similarity graph 135 is matrix, a table, or other data structure that includes a set of nodes (e.g., rows) representing each of the variables 132 of the user data set 131 and another set of nodes (e.g., columns) also representing each of the variables 132 of the user data set 131, and links representing degrees of similarity between feature vectors of pairs of variables 132 represented by nodes intersecting at each link of the variable similarity graph 135.

In some embodiments, as shown in FIG. 1, the visualization computing system 130 modifies the variable similarity graph 135 using graph training data 136 that includes a user selection history 137 and historical pairing data 138. The user selection history 137 includes a frequency, distribution, or other metric describing past user usage for one or more pairs of the variables 132 of the user data set 131. The historical pairing data 138 includes a frequency, distribution, or other metric describing past usage for one or more of pairs of variables 132 of the user data set 131 by multiple users of the visualization application 139. For example, the user selection history 137 represents individual user selection data and the historical pairing data 138 represents aggregate selection data of multiple users. The visualization computing system 130 determines the user selection history 137 and/or historical pairing data 138 according to frequencies of variable pairs depicted in actual visualization data structure outputs generated by the visualization computing system 130 from the user data set 131 and/or previous user data sets.

As shown in FIG. 1, the visualization computing system 130 communicates with the presentation device 110. The presentation device 110 displays user interface 111, displays user interface 111' in response to receiving a selection 101 of a second field 113 of the user interface 111, and then displays user interface 111" in response to receiving a selection 102 of a particular second variable from a ranked recommended subset 117 of secondary variables.

The user interface 111 enables a user to select variables from the user data set 131 for use to generate a visual representation based on the user data set 131. The presentation device 110 displays a user interface 111 comprising a first field 112 and a second field 113. First and second fields 112 and 113 are interface elements that receive input for selecting a primary variable and a secondary variable, respectively. For example, each of the first field 111 and the second field 112 is implemented using an event listener that detects input events (e.g., clicks, taps, select-and-release) that are located or otherwise directed to the user interface 111 element for the particular variable. The visualization application 139 uses the primary variable and the secondary variable to generate a visual representation using the user data set 131.

The first field 112 includes a list of recommended variables 114 from the user data set 131 including a selected primary variable 115. For example, a user previously selected, via the user interface 111, the selected primary variable 115 from the list of recommended variables 114. The selected primary variable 115 is bolded, highlighted, marked, or otherwise emphasized in the list of recommended variables 114 to indicate that the selected primary variable 115 was selected by the user from the list of recommended variables 114.

In response to receiving a selection of the second field 113 in the user interface 111, the presentation device 110 renders user interface 111' including the first field 112' and the second field 113'. The first fields 112' displays the selected primary variable 115', as previously displayed in user interface 111. The second field 113' includes or is adjacent to a contextual menu 116. The contextual menu 116 includes interface elements for selecting a secondary variable from a ranked recommended subset 117 of secondary variables. The visualization application 139 determines the ranked recommended subset 117 based at least in part on the variable similarity graph 135, as described in further detail below with respect to FIGS. 2 and 6.

In response to receiving a selection of a particular secondary variable from the ranked recommended subset 117 in the contextual menu 116 of the second field 113' in the user interface 111', the presentation device 110 renders user interface 111". The user interface 111" includes the first field 112" and the second field 113". The first field 112" displays the selected primary variable 115", as previously displayed in the user interfaces 111 and 111'. The second field 113" includes the secondary variable 118 that was selected from the contextual menu 116.

In the examples described herein, the presentation device 110 is separate from the visualization computing system 130. However, in some embodiments, the presentation device 110 is a component or subsystem of the visualization computing system 130, the visualization computing system 130 is a component or subsystem of the presentation device 110, or the functions of both the presentation device 110 and the visualization computing system 130 are performed by a combined device or system. In some embodiments, a mobile computing device performs one or more the functions of the visualization computing system 130 and the functions of the presentation device 110 described in the examples above.

One or more of the presentation device 110 and the visualization computing system 130 include a device having a communication module capable of transmitting and receiving data over a data network. For instance, one or more of the presentation device 110 and the visualization computing system 130 include a server, a desktop computer, a laptop computer, a tablet computer, a television with one or more processors embedded therein and/or coupled thereto, a smart phone, a hand-held computer, or any other wired or wireless, processor-driven device. Examples of the data network include, but are not limited to, internet, local area network ("LAN"), wireless area network, wired area network, wide area network, and the like. The data network includes a wired or wireless telecommunication means by which network systems communicate and exchange data. For example, each data network is implemented as, or is a part of, a storage area network ("SAN"), a personal area network ("PAN"), a metropolitan area network ("MAN"), a LAN, a wide area network ("WAN"), a wireless LAN ("WLAN"), a virtual private network ("VPN"), an intranet, an Internet, a mobile telephone network, a card network, a Bluetooth network, a Bluetooth low energy ("BLE") network, a near field communication ("NFC") network, any form of standardized radio frequency, or any combination thereof, or any other appropriate architecture or system that facilitates communication of signals, data, and/or messages (generally referred to as data). It should be understood that the terms "data" and "information" are used interchangeably herein to refer to text, images, audio, video, or any other form of information that exists in a computer-based environment.

Examples of Operations for Updating a User Interface to Include a Contextual Menu FIG. 2 depicts an example of a method 200 for updating a user interface to include a contextual menu of recommended secondary variables that are relevant to another variable selected in the user interface. For illustrative purposes, the method 200 is described with reference to the components illustrated in FIG. 1, although other implementations are possible. For example, the program code for the visualization application 139, which is stored in a non-transitory computer-readable medium, is executed by one or more processing devices to cause the visualization computing system 130 to perform one or more operations described herein.

At block 210, the method 200 involves receiving a user data set 131 having variables 132 and corresponding values sets 133. Values sets 133 comprise values including amounts, percentages, text, descriptors, symbols, or other values that indicate how a variable applies to different entities of the user data set 131. Values indicate a measure of a variable as applied to an entity, an identification of a species of the entity within a genus indicated by the variable, a unique sequence of alphanumeric and/or symbolic characters (e.g., a name or identifier), or other appropriate value that describes how a variable applies to an entity.

The user data set 131 is in the form of a spreadsheet, a table, a matrix, or other representation of the user data set that indicates for each entity values corresponding to each variable represented by a row or column of the representation. In an example, the user generates the user data set 131 using the visualization application 139. In yet another an example, the visualization application 139 receives a user data set 131 generated by a user and uploaded to the visualization application 139 via a computing device of the user. In some examples, the user generates the user data set 131 via a separate application to the visualization application 139. In another example, the visualization application 139 receives and stores multiple user data sets 131 from various entities and receives a selection by the user of the user data set 131 via the visualization application 139 from among the multiple stored user data sets 131.

An example of a user data set for four city entities includes the variables City Name, State/Province, Age of City in Years, and Population and values sets include value set {Savannah, Charleston, Wilmington, Baltimore} corresponding to variable City Name, value set {Georgia, South Carolina, North Carolina, Maryland} corresponding to variable State/Province, value set {287, 350, 281, 291} corresponding to Age in Years, and value set {136286, 137566, 123744, 593490} corresponding to Population. In this example, variables include categorical variables (e.g., State/Province), numeric variables (e.g., Age in Years and Population), and variables that identify a name or identifier (e.g., City Name). Other types of variables 132 that provide a dimension, category, identifier or other concept ascribed to entities using values sets 133 are included in the user data set 131.

The method 200 further involves generating a contextual menu or other interface tool that increases the accessibility of interface elements according to their relevance. For instance, one or more operations described herein with respect to blocks 220-280, including the examples described below with respect to FIGS. 3-6, can be used to implement a step for generating a menu in which interface elements for selecting secondary variables are configured based on relevance of the secondary variables to a first variable.

At block 220, the method 200 involves computing a feature vector for each variable of the user data set 131 based on variable statistics data 134 of a corresponding values set 133. The visualization application 139 generates a feature vector from statistics determined from the values set associated with the respective variable. For instance, the feature vector for a variable could be a k-dimensional embedding that is made up of each of k primary and/or secondary statistics for the values set. The visualization application 139 generates a feature vector that is specific to a values set for a variable in the user data set 131. For instance, the visualization application 139 computes values of various primary statistics and, in some cases, secondary statistics for the values set. The visualization applications populates each element of a feature vector with a respective statistical value. For instance, the feature vector for a variable x could be [means of values of x, median of values of x, number of outliers of values of x, . . . $k^{th}$ statistic for x]. The set of statistical values thus determines a feature vector for a given variable of the user data set 131. A detailed example of computing a feature vector for each variable of a user data set 131 based on variable statistics data 134 of a corresponding values set 133 is described herein with respect to FIG. 3.

At block 230, the method 200 involves generating a variable similarity graph 135 having nodes connected by links, the nodes representing variables, and the links representing degrees of similarity between feature vectors of variables. For instance, the visualization application 139 generates the variable similarity graph 135 with nodes representing feature vectors of respective variables and determines link similarity values between pairs of nodes representing feature vectors corresponding to each respective pair of nodes. The visualization application 139 modifies one or more link similarity values in the variable similarity graph 135 based on graph training data 136 (e.g., a user selection history 137 and/or historical pairing data 138 and/or pairing rule sets associated with specific variables and stores the variable similarity graph 135. A detailed example generating a variable similarity graph is described herein with respect to FIGS. 4 and 5.

At block 240, the method 200 involves generating, for display on a presentation device 110, a user interface 111 that includes a first field 112 for selection of a primary variable of the user data set 131 and a second field 113 for selection of a secondary variable of the user data set 131. For instance, the visualization application 139 generates for display on the presentation device a user interface 111. The user interface 111 includes an interface object that in response to being selected by the user causes the first field to receive input for selection of a secondary variable and the second field to receive input for selection of a primary variable. In the user interface 111, the first and second fields 112 and 113 are interface elements configured for receiving input selecting variable identifiers (e.g., via selection from respective lists) corresponding to variables of the user data set 131 to request generation of a visual representation. In some embodiments, a primary variable corresponds to an x-axis in a visual representation and a secondary variable corresponds to a y-axis in the visual representation (or vice versa).

At block 250, the method 200 involves receiving a selection of a first variable via the first field 112 of the user interface 111. For example, the user desires to select a primary variable to use to generate a visual representation and selects the first field 112 of the user interface 111. In response to detecting a selection of the first field 112, the presentation device 110 displays a recommended list of variables 114 in a menu or other object of the user interface 111 suitable to both display the recommended list of variables 114 and receive a selection of a particular selected primary variable 115 from among the recommended list of variables 114. In some embodiments, the recommended list of variables 114 is a list of all variables 132 of the user data set 131.

In additional or alternative embodiments, the recommended list of variables 114 is a ranked list of the variables 132 of the user data set 131. The visualization application 139 uses a principal direction of a first singular eigenvector as a function to rank each of the variables 132 based on the data in the variable similarity graph 135. In other examples, the visualization application 139 uses other ranking functions, such as a rule-based or unsupervised feature scoring method or a supervised approach that is based on user feedback from multiple users of the visualization application 139. In other examples, the visualization application 139 generates and displays a list of recommended variable identifiers so that a first variable identifier having a higher past frequency of selection in the first field 112 by the multiple users of the visualization application 139 is ranked higher than a second variable identifier having a lower past frequency of selection when compared to the first variable identifier.

In additional or alternative embodiments, the visualization application 139 retrieves a co-selection history in the historical pairing data 138 that indicates a co-selection (e.g., the variables are jointly selected to generate a plot or chart) frequency of variable pairs of the data set 131. The visualization application 139 generates training data including (a set of variable pairs having at least a co-selection frequency that is greater than a predetermined threshold co-selection frequency. The visualization application 139 learns, using the training data, a decision function that selects a secondary variable for a variable pair based on a selection of a primary variable. Using the decision function, the visualization application 139 predicts probabilities for a user selecting given a primary variable selected via a first field 112, each of the variables 132 of the data set 131 as a secondary variable via a second field 113, and (3) ranking the secondary variables according to the respective determined probability.

At block 260, the method 200 involves detecting a selection of the second field 113 of the user interface 111. The dashboard detects the selection of the second field 113 in response to the user selecting the second field 113 via the user interface 111. The user, having input the selected primary variable 115 into the first field 112, selects the second field 113 to input a second variable with which to generate a visual representation that is based on the selected primary variable 115 and a particular second variable to be selected. In some embodiments, the user has not decided which secondary variable to input prior to selecting the second field 113 of the user interface 111. In other cases, the user already has an idea of a secondary variable that the user desires to select via the second field 113.

At block 270, the method 200 involves identifying a relationship between the first field 112 and the second field 113. The visualization application 139 pre-configures the user interface 111 so that the first and second fields 112 and 113 are related so that selection of variable identifiers in the first and second fields 112 and 113 results in generation of a visual representation (e.g., a plot, a heat map, an image, a chart) for visualizing the user data set 131 using the variables corresponding to the selected variable identifiers in the first and second fields 112 and 113.

In some embodiments, the user selects one or more objects on the user interface 111 to establish the relationship between the first field 112 and the second field 113. For example, the user inputs an option via the user interface 111 that indicates a desire to generate a visual representation of the user data set 131 according to the variables identified by variable identifiers input into the first field 112 and the second field 113. In this example, the user inputting the option to generate the visual representation using the variables indicated by the first and second fields 112 and 113 establishes the relationship between the first field 112 and the second field 113. In some examples, in response to the user inputting the option that establishes the relationship between the first field 112 and the second field 113, the visualization application 139 determines, for each variable selectable via the first field 112, a recommended list of variable identifiers for the second field 113. In some embodiments, the user activates or otherwise selects a user interface 111 object that indicates a data visualization type (e.g., a plot, a histogram, a bar chart, a pie chart) to generate using variables selected in the first and second fields 112 and 113.

At block 280, the method 200 involves generating an interface element, such as a contextual menu 116, of recommended secondary variables for use with the selected first variable. The visualization application 139 generates the contextual menu 116 by identifying which variables are more relevant (e.g., similar) to the first variable selected at block 250. The visualization application 139 retrieves the variable similarity graph 135 associated with the data set 131 including link similarity values for pairs of variables in the variable similarity graph 135. As previously discussed, a link similarity value indicates a similarity between a feature vector of a variable of a pair of variables to a feature vector of the other variable of the pair of variables. In an example, the visualization application 139 includes the other variable in the contextual menu 116 in response to determining that a link similarity value in the variable similarity graph 135 between a pair of nodes including the variable and the other variable is greater than a threshold link similarity value. In this example, the visualization application 139 excludes, in response to determining that a link similarity value between a second pair of nodes representing the variable and an additional variable is less than the threshold link similarity value, the additional variable from the contextual menu 116. A detailed example of generating a contextual menu 116 is described herein with respect to FIG. 6.

In some embodiments, the visualization application 139 generates, at block 280, a different interface element, such as a list or other display element, that depicts a set of recommended secondary variables. Such an interface element could position more relevant variable more prominently, such as by including more relevant variables near a prominent position like the upper portion and/or left hand of the interface element and excluding less relevant variable from the prominent position (e.g., by omitting less relevant variables or positioning them toward the lower portion and/or left hand of the interface element).

At block 290, the method 200 involves updating, for display on the presentation device 110, the user interface 111 to include the contextual menu 116 or other interface element. As illustrated in FIG. 1, in response to receiving the selection 101 of the second field 113 of the user interface 111, the dashboard application renders user interface 111' including the contextual menu 116 displayed in the second field 113' (corresponding to the second field 113 displayed in the user interface 111), the contextual menu 116 including the ranked list of secondary variables, which is depicted as the ranked recommended subset 117 in FIG. 1.

In some embodiments, the updated user interface 111' displays the first field 112' and the selected primary variable 115' corresponding to the first field 112 and the selected primary variable 115 displayed in the user interface 111. In some embodiments, the user selects a particular secondary variable from the contextual menu 116 via the user interface 111' and the visualization application 139 updates the user interface 111' to render the user interface 111" the second field 113" displaying the selected particular secondary variable (depicted as the selected secondary variable 118 in FIG. 1).

In some embodiments, the user interface 111" includes the first field 112" and the selected primary variable 115" as previously displayed in the user interfaces 111 and 111'. The visualization application 139 generates a visual representation that provides a visualization of the user data set 131 using the selected primary and secondary variables 115 and 118 and display the visual representation via the user interface 111 of the presentation device 110.

In some embodiments, the visual representation includes a chart with an x-axis representing the selected primary variable 115 and a y-axis representing the selected secondary variable 118. In some embodiments, the visualization application 139 generates other visual representation types using the selected variables of the user data set 131 in response to user input via user interfaces 111, 111', and 111". In some embodiments, the visualization application 139 generates visual representation types in response to user input received via previous and/or subsequent user interfaces to those depicted in FIG. 1 requesting a particular type of visual representation.

FIG. 3 depicts an example of a method for computing, at block 220 of the method 200, feature vectors that represent sets of values of different variables. For illustrative purposes, the method for implementing block 220 is described with reference to the components illustrated in FIG. 1, although other implementations are possible. For example, the program code for the visualization application 139, which is stored in a non-transitory computer-readable medium, is executed by one or more processing devices to cause the visualization computing system 130 to perform one or more operations described herein. The method for implementing block 220 is performed for one or more variables of the user data set 131.

At block 310, the method for implementing block 220 involves determining primary statistics based on the values set. To do so, the visualization application 139 retrieves the values set corresponding to the variable for which primary statistics are to be determined from the values set 134 data of the user data set 131. The values set includes a row or a column of a table, matrix, or other data structure of the user data set 131. The visualization application 139 determines primary statistics for the values set by applying one or more statistical functions to the values set. Examples of statistical functions include functions to determine a mean, a median, a minimum, a maximum, a density, a number of outliers, a number of unique values, a percentage of unique values, a density, a first quartile ("Q1"), a third quartile ("Q3"), an interquartile range ("IQR"), a percent of outliers present, Fisher/Pearson kurtosis, biased/unbiased kurtosis.

In some embodiments, the visualization application 139 first determines (e.g., by using a binning operation) a probability distribution of the values of the values set and then apply statistical functions to the probability distribution to determine one or more of the primary statistics. In a user data set 131 describing four city entities having variables/data sets including City Name: {Savannah, Charleston, Wilmington, Baltimore}, State/Province: {Georgia, South Carolina, North Carolina, Maryland}, Age in Years: {287, 350, 281, 291}, and Population: {136286, 137566, 123744, 593490}, the visualization application 139 applies a mean function to the values set associated with the variable Population to determine a mean Population statistic of 247772 and a number of outliers function to determine that the values set has an outlier count Population statistic of one (the 593490 value).

At block 320, the method for implementing block 220 involves determining secondary statistics based on the primary statistics of the values set 133. For instance, the visualization application 139 derives secondary statistics from determined primary statistics by applying, for example, functions such as aggregators, operators, linear or non-linear transformations to primary statistics of the variable to generate secondary statistics for the variable. An example of a secondary statistic includes a linear or non-linear transformation of two or more of the determined primary statistics. In some embodiments, the visualization application 139 generates secondary statistics by inputting the primary statistics to a neural network or other automatic secondary statistic construction approach.

In some embodiments, the visualization application 139 removes redundant or noisy statistics from the variable statistics data 134 using an unsupervised statistic selection approach. The visualization application 139 reduces bias when determining similarity between pairs of variables (through determining similarities of feature vectors) by removing redundant or noisy statistics. An example of a statistic selection approach includes (1) generating a statistic similarity graph where nodes represent statistics, and links between statistics include similarity values describing a similarity between pairs of statistics for the values set corresponding to the variable, (2) removing links having similarity values less than a threshold link similarity value, and (3) determining a group of connected nodes of the statistic similarity graph, which represent similar statistics, and remove all statistics of the group except one representative statistic. The threshold link similarity value in step (2) of this statistic selection approach example is a predetermined value configured by the user or by an operator of the visualization computing system 130 or is a value determined by applying a function to the distribution of the values set corresponding to the variable.

In an illustrative example, the visualization application 139 removes all links with link similarity values below a threshold link similarity value from a variable similarity graph. After all links with link similarity values below the threshold link similarity value are removed, a node A representing statistic A is connected via a link to a node B representing statistic B and via a link to a node C representing statistic C. Node B is also connected via links to nodes A and C and node C is also connected via links to nodes A and B. The interconnected group of nodes A, B, and C constitute a "clique," which indicates that a redundant set of statistics are represented by the nodes. Cliques include any number of interconnected nodes, for example, three nodes ("a triangle"), four nodes, ten nodes, or other appropriate numbers or configurations of interconnected nodes. In some embodiments, to qualify as a clique, each node in the clique must be connected to every other node in the clique. In other examples, to qualify as a clique, each node in the clique must be connected to a threshold number of other nodes in the clique or to a threshold proportion of total nodes in the clique.

At block 330, the method for implementing block 220 involves generating a feature vector based on remaining variable statistics data 134. The visualization application 139 determines primary statistics for each variable by applying statistical functions to the corresponding values set, determines secondary statistics for each variable derived from the primary statistics, and removes any redundant and/or noisy variables using a statistic selection approach to determine the remaining variable statistics data 134 for the variable. After block 330, the method for implementing block 220 ends and the method 200 continues at block 230 of FIG. 2.

FIG. 4 depicts an example of a method for implementing block 230 for generating a variable similarity graph 135 that indicates degrees of similarity between feature vectors and that is used to generate a contextual menu, according to certain embodiments. For illustrative purposes, the method for implementing block 230 is described with reference to the components illustrated in FIG. 1, although other implementations are possible. For example, the program code for the visualization application 139, which is stored in a non-transitory computer-readable medium, is executed by one or more processing devices to cause the visualization computing system 130 to perform one or more operations described herein.

At block 410, the method for implementing block 230 involves generating a variable similarity graph 135 for the user data set 131 with nodes representing feature vectors of respective variables. The visualization application 139 generates a variable similarity graph 135 having nodes connected by links, the nodes representing variables, and the links representing degrees of similarity between feature vectors of variables 132. The variable similarity graph 135 includes matrix, a table, or other data structure that includes a set of nodes (e.g., rows) representing each of the variables of the user data set and another set of nodes (e.g., columns) also representing each of the variables of the user data set. For example, a variable similarity graph 135 that includes a matrix has links including an intersection in the matrix for a row representing a first variable of a variable pair and a column representing a second variable of the variable pair. In this example, a link similarity value is a value at the intersection in the matrix. For example, in a data set including variables A, B, C, . . . Z having variable similarity graph 135 in the form of a matrix, a link similarity value of link (I, J) represents a value at an intersection in the matrix of a row representing variable I and a column representing variable J. In this example, the link similarity value of link (I, J) indicates a degree of similarity between feature vectors of the variables I and J.

At block 420, the method for implementing block 230 involves determining link similarity values between pairs of nodes in the variable similarity graph 135 based on feature vectors corresponding to each node of the respective pair of nodes. The visualization application 139 determines the link similarity values for the variable similarity graph 135 representing the degree of similarity between feature vectors of pairs of variables corresponding to nodes associated with the link. To determine the link similarity value, the visualization application 139 applies a similarity function to the feature vectors associated with the pair of variables associated with the link. Examples of similarity functions include a parameterized similarity function (e.g., a radial basis function ("RBF")), a correlation function, and a polynomial kernel function.

In some embodiments, the visualization application 139 hashes or clusters link similarity values and prunes the edges of the variable similarity graph 135 in order to reduce usage of computational resources.

Figure 5:
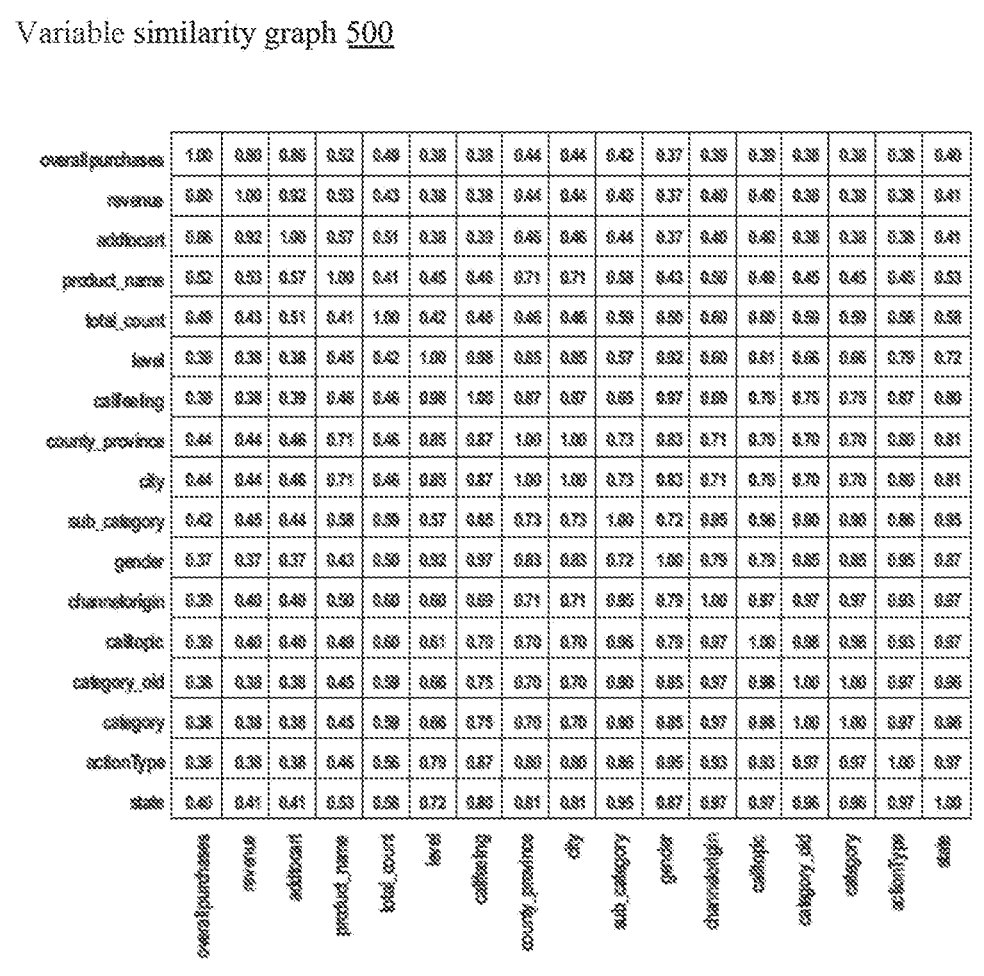

FIG. 5 depicts an example of an implementation of a variable similarity graph 500, according to certain embodiments described in the present disclosure. The stored variable similarity graph 500 is implementable in a computer code representation. As illustrated in FIG. 5, the variable similarity graph 500 includes a set of rows and a set of columns, where the label applied to each row or column is a specific node. Each set rows represents the set of variables 132 of a user data set 131, and each set of columns represents the same set of variables 132. The links of the variable similarity graph 500 are represented in FIG. 5 as table entries at the intersections of rows and columns. For instance, a decimal number at the intersection of "overall purchases" and "revenue" indicating a similarity value of the "overall purchases" and "revenue" nodes. In other examples not depicted in this illustration, the first set of nodes may be different or otherwise not completely correspond to the second set of nodes; for example, nodes originally in either the first set or second set may be pruned from the respective set of nodes as described previously. Returning to FIG. 4 the visualization application 139 modifies the variable similarity graph using one or more steps described in blocks 430, 440, and 450. For example, the visualization application 139 removes link similarity values that are below a threshold link similarity value so that only links between pairs of nodes having a minimum similarity are in the variable similarity graph 135. The visualization application 139 modifies the link similarity values by analyzing graph training data (e.g., user selection history and historical pairing data) and variable pairing rules. For example, the visualization application 139 increases or decreases a link similarity value for a link in the variable similarity graph 135 in response to determining that the user's past selection frequency or a co-selection frequency for multiple users of the visualization application 139 is greater or less than a threshold frequency, respectively. In other examples, the visualization application 139 determines frequency distributions of variable co-selection in either the user selection history or the historical pairing data. In these other examples, the visualization application 139 determines a multiplier between zero and one to multiply against a link similarity value based on a position in the distribution of the a variable co-selection indicating selection of the variable pair associated with the link similarity value. In some examples, variable pairing rules may indicate that a first variable of the link cannot be used along with the second variable in the link to generate a visual representation of the data set and the visualization application removes the link for the variable pair from the variable similarity graph 135. In additional or alternative embodiments, however, the visualization application 139 does not modify the variable similarity graph 135 by using co-selection frequencies in graph training data 136 or through using variable pairing rules.

At block 430, the method for implementing block 230 involves modifying the link similarity values in the variable similarity graph 135 based on graph training data 136 including a user selection history 137. The user selection history 137 shows how frequently the user has selected, over a historical time period, each possible variable pairing in the user data set to generate visual representation using the visualization application 139. The visualization application 139 determines a probability distribution of co-selection frequencies for each variable pair represented by the variable similarity graph 135 indicated by the user selection history 137. In some examples, the visualization application 139 determines a multiplier to multiply against the link similarity value to determine a modified link similarity value. The visualization application 139 determines the multiplier from a position of the co-selection frequency of the variable pair associated with the link in the frequency distribution determined from the user selection history 137. In some examples, the multiplier is a number between zero and one and the visualization application 139 determines a higher multiplier from a co-selection frequency of a first variable pair and a lower multiplier from a co-selection frequency of a second variable pair when a first frequency of the first variable pair is greater than a second frequency of the second variable pair. In some examples, the visualization application 139 normalizes the probability distribution of co-selection frequencies from the user selection history so that each variable pair probability is between zero and one. In these examples, the link similarity value corresponding to a respective variable pair in the probability distribution is multiplied by the probability of the respective variable pair in the normalized probability distribution. In some examples, modifying the link similarity values results in increasing a link similarity value for a first pair of variables that the user has more frequently selected together in the past compared to a selection frequency of a second pair of nodes and decreasing a link similarity value for the second pair of variables that the user has less frequently selected together.

At block 440, the method for implementing block 230 involves modifying the link similarity values in the variable similarity graph 135 based on graph training data 136 including historical pairing data 138. In some examples, historical pairing data 138 indicates frequencies of variable pairings (co-incidence frequencies) encountered in visual representations generated for multiple users of the visualization application 139. The visualization application 139 determines a probability distribution of co-incidence frequencies for each variable pair represented by the variable similarity graph 135 indicated by the historical pairing data 138. In some examples, the visualization application 139 determines a multiplier to multiply against the link similarity value to determine a modified link similarity value. The visualization application 139 determines the multiplier from a position of the co-incidence frequency of the variable pair associated with the link in the frequency distribution determined from the historical pairing data 138. In some examples, the multiplier is a number between zero and one and the visualization application 139 determines a higher multiplier from a co-incidence frequency of a first variable pair and a lower multiplier from a co-incidence frequency of a second variable pair when a first frequency of the first variable pair is greater than a second frequency of the second variable pair. In some examples, the visualization application 139 normalizes the probability distribution of co-incidence frequencies from the historical pairing data 138 so that each variable pair co-incidence frequency is between zero and one. In these examples, the link similarity value corresponding to a respective variable pair in the probability distribution is multiplied by the probability of the respective variable pair in the normalized probability distribution. In an example, modifying the link similarity values results in increasing a link similarity value for a first pair of variables that have occurred together more often in generated visual representations compared to a second pair of variables that occurred together less often in generated visual representations. In this example, modifying the link similarity values results in decreasing a link similarity value in the variable similarity graph 135 for a second pair of variables that have occurred together less often in generated visual representations than the first pair of variables.

At block 450, the method for implementing block 230 involves excluding, for each node, link similarity values associated with other nodes violating a rule set associated with the respective node. The visualization application 139 removes link similarity values for variable pairs that do not comply with pairing rules. For example, the visualization application 139, for each variable of the user data set 131, retrieves pairing rules including a list of secondary variables with which the variable cannot be paired and remove any link similarity values from the variable similarity graph 135 corresponding to node pairs including the variable and one of the secondary variables indicated by the pairing rules list.

An example of a type of pairing rule is a pairing rule that excludes certain pairs of variables for particular data visualization types. For example, a pairing rule specifies that line charts do not support pairing of two categorical variables, or, more specifically, that categorical variable A cannot exist in a variable pair with categorical variable B to generate a line chart.

An example of a set of pairing rules specifies variable pairs that are valid or invalid based on variable type. For example, a first variable pairing rule specifies that only a secondary variable having a numeric values set is selectable with primary variables also having numeric values sets to generate a first type of visual representation (e.g., a line chart). This first variable pairing rule prevents a user from attempting to invalidly generate a line chart, which requires numerical values on the x-axis and y-axis. A second variable pairing rule of the set of pairing rules specifies that only a secondary variable with a categorical label values set (e.g., State/Province of City) is selectable along with primary variables also having a categorical label values set to generate a second type of visual representation (e.g., a contingency table). This second variable pairing rule prevents a user from attempting to invalidly generate a contingency table, which requires two categorical variables. A third variable pairing rule of the set of pairing rules specifies that only a secondary variable having a category label values set is selectable along with primary variables having numeric values sets to generate a third type of visual representation (e.g., a categorical bar chart). This third variable pairing rule prevents a user from attempting to invalidly generate a categorical bar chart, which requires a categorical x-axis and a numerical y-axis (or vice versa), with either two categorical variables or two numerical variables.

In some embodiments, the visualization application 139 generates separate variable similarity graphs 135 with nodes associated with excluded links. For example, the visualization application 139 generates variable similarity graphs 135 for variables used to generate particular types of visual representations. For example, the visualization application 139 stores a first variable similarity graph 135 for the data set 131 for use when a user selects variables to generate a line chart and a second variable similarity graph 135 for the data set 131 for use when a user selects variables to generate a histogram.

At block 460, the method for implementing block 230 involves storing the variable similarity graph 135 including the remaining modified link similarity values. The visualization application 139 excludes link similarity values and/or modifies link similarity values in the variable similarity graph 135 according to methods described in blocks 430, 440, and 450 to generate the variable similarity graph 135 including the remaining modified link similarity values. The visualization application 139 stores the variable similarity graph 135 in a data storage unit of the visualization computing system 130 or in a data storage unit otherwise accessible to the visualization application 139. In some embodiments, the visualization application 139 stores multiple variable similarity graphs 135, for example, for each of a set of data visualization types. After block 460, the method for implementing block 230 ends and the method 200 continues at block 240 of FIG. 2.

FIG. 6 depicts an example of a method for implementing block 280. For illustrative purposes, the method for implementing block 280 is described with reference to the components illustrated in FIG. 1, although other implementations are possible. For example, the program code for the visualization application 139, which is stored in a non-transitory computer-readable medium, is executed by one or more processing devices to cause the visualization computing system 130 to perform one or more operations described herein.

In some embodiments, the visualization application 139 performs steps described in blocks 610, 620, 630, and 640 after receiving the selection of the selected primary variable 115, receiving the selection of the second field 113 of the user interface 111, and determining the relationship between the first field 112 and the second field 113. In additional or alternative embodiments, the steps of blocks 610, 620, 630, and 640 are performed concurrently or subsequently to generating the variable similarity graph 135 for the user data set 131 (or to generating multiple variable similarity graphs 135 for the user data set 131). For example, when the visualization application 139 generates the variable similarity graph 135, the visualization application 139 preemptively generates a contextual menu 116 for each possible primary variable 115 that is available to select via the first field 112 and store the contextual menu 116 for immediate retrieval upon receiving the selection of a selected primary variable 115.

At block 610, the method for implementing block 280 involves retrieving link similarity values corresponding to a node associated with the selected first variable from the variable similarity graph 135. The visualization application 139 retrieves the variable similarity graph 135 associated with the user data set 131 and identify all link similarity values from the variable similarity graph 135 corresponding to node pairs including the selected primary variable 115. In some embodiments, the user indicated, via the user interface 111, a request to generate a particular data visualization type and the visualization application 139 retrieves a particular variable similarity graph 135 associated with both the user data set 131 and the particular data visualization type. The visualization application 139 retrieves the variable similarity graph 135 from a data storage unit of the visualization computing system 130. Identifying the link similarity values includes identifying variable pairs associated with each of the link similarity values and the similarity values for the variable pairs.

At block 620, the method for implementing block 280 involves excluding a link similarity value corresponding to a node associated with a first secondary variable in response to determining that the similarity value of the link similarity value corresponding to nodes for the selected primary variable 115 and the first secondary variable is below a threshold link similarity value. The threshold link similarity value is configured by an operator of the visualization computing system 130, by the user, or determined from a statistics (e.g., a mean) of a distribution of the link similarity values corresponding to the node in the variable similarity graph 135. For example, the visualization application 139 excludes links of the variable similarity graph 135 having link similarity values that are below the top quartile of the distribution of the similarity values of the link similarity values.

At block 630, the method for implementing block 280 involves ranking the non-excluded link similarity values, the ranked list including a link similarity value corresponding to a node associated with a second secondary variable. For example, the visualization application 139 ranks any link similarity values of the variable similarity graph 135 from highest similarity value to lowest similarity value (or vice versa). In an example, the ranked list includes a link similarity value corresponding to a node associated with a second variable. The visualization application 139 ranks the list of retrieved link similarity values, minus any link similarity values that the visualization application 139 has excluded, from highest similarity value to lowest similarity value. In some embodiments, the visualization application 139 splits the ranked list of non-excluded link similarity values into groups of categories (e.g., numeric, categorical variables) of the secondary variable corresponding to the node of the link similarity value and ranks the link similarity values within each category group from highest similarity value to lowest similarity value.

At block 640, the method for implementing block 280 involves generating a contextual menu 116 of recommended secondary variable identifiers according to the ranking of non-excluded link similarity values for selection via the second field 113 of the user interface 111. The visualization application 139 converts the ranked list of link similarity values to a ranked list of secondary variable identifiers identifying secondary variables associated with the node of each respective link similarity value not corresponding to the first selected variable 115. In some embodiments, the contextual menu 116 includes a scrollable menu that is projected from the second field 113 to a region of the user interface 111 below the second field 113 in response to the user selecting the second field 113 and that presents the ranked list of secondary variables for selection by the user of a particular secondary variable In an embodiment, the contextual menu 116 includes user interface 111 elements that identify each of the ranked list of secondary variables. For example, each user interface 111 element is implemented using an event listener that detects input events (e.g., clicks, taps, select-and-release) that are located or otherwise directed to the user interface 111 element for the particular variable. In this embodiment, one or more event handlers configure the visualization application 139 to associate the second field with the selected variable from the data set 131. In some embodiments, user interface 111 elements for all variables 132 (or all variables 132 having links not excluded from the variable similarity graph 135) are included in the contextual menu and ranked, however, lower-ranked variables are excluded from an upper portion of the menu reserved for predetermined number of higher-ranked variables. For example, the contextual menu 116 displays user interface 111 elements representing variables in order of rank of highest to lowest link similarity value and five (or other predetermined number) of the variables having the highest link similarity values of the link similarity values not excluded from the variable similarity graph 135 are represented by user interface 111 elements in an upper portion of the contextual menu 116 and the remaining variables are represented by user interface 111 elements in a lower portion of the contextual menu 116. In this example, both the user interface 111 elements in the upper portion and the user interface 111 elements in the lower portion are ranked from highest link similarity value to lowest similarity value. After block 640, the method for implementing block 280 ends and the method 200 continues at block 290 of FIG. 2.

Example of a computing system for implementing certain embodiments

Figure 7:
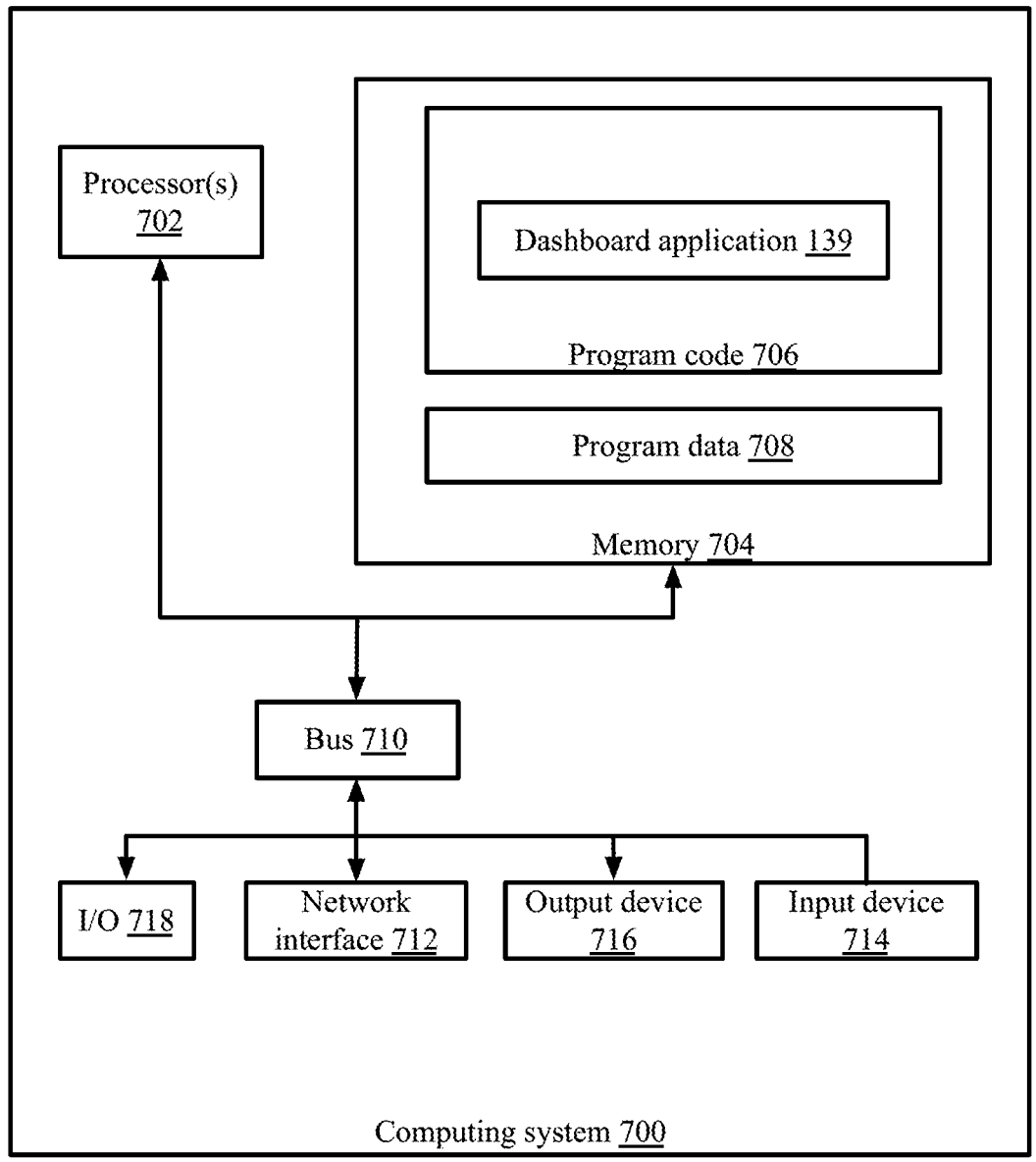
FIG. 7 depicts an example of a computing system that performs certain operations described herein, according to certain embodiments described in the present disclosure.

Any suitable computing system or group of computing systems is used for performing the operations described herein. For example, FIG. 7 depicts an example of a computing system 700. The computing system 700 includes the visualization application 139.

The depicted examples of a computing system 700 includes one or more processors 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 includes any number of processing devices, including a single processing device.

The memory device 704 includes any suitable non-transitory computer-readable medium for storing data, program code, or both. A computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device reads instructions.

The computing system 700 executes program code 706 that configures the processor 302 to perform one or more of the operations described herein. The program code 706 includes, for example, the visualization computing system 130 including the visualization application 139, or other suitable applications that perform one or more operations described herein. The program code 706 is resident in the memory device 704 or any suitable computer-readable medium and is executed by the processor 702 or any other suitable processor. The program code includes processor-specific instructions generated by a compiler or an interpreter from code written in any suitable computer-programming language, including, for example, C, C++, C#, Visual Basic, Java, Python, Perl, JavaScript, and ActionScript.

In some embodiments, program code 706 for implementing the visualization application 139 are stored in the memory device 704, as depicted in FIG. 3. In additional or alternative embodiments, program code 706 for the visualization application 139 is stored in different memory devices of different computing systems. In additional or alternative embodiments, the program code 706 described above is stored in one or more other memory devices accessible via a data network.

The computing system 700 accesses program data 708, which includes one or more of the datasets described herein (e.g., the user data set 131, the variables 132, the values sets 133, the variable statistics data 134, the similarity graph 135, the graph training data 136, the user selection history 137, and the historical pairing data 138), in any suitable manner. In some embodiments, some or all of one or more of these data sets, models, and functions are stored as the program data 708 in the memory device 704, as in the example depicted in FIG. 3. In additional or alternative embodiments, one or more of these data sets, models, and functions are stored in the same memory device (e.g., one of the memory device 704). For example, a common computing system, such as the visualization computing system 130 depicted in FIG. 1, includes hardware, software, or both that implements the visualization application 139. In additional or alternative embodiments, one or more of the programs, data sets, models, and functions described herein are stored in one or more other memory devices accessible via a data network.

The computing system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and the like. The computing system 700 is able to communicate with one or more other computing devices (e.g., presentation device 110) via a data network using the network interface device 712.

The computing system 700 also includes a number of external or internal devices, such as input or output devices. For example, the computing system 700 is shown with one or more input/output ("I/O") interfaces 718. An I/O interface 718 receives input from input devices or provide output to output devices. One or more buses 710 are also included in the computing system 700. The bus 710 communicatively couples one or more components to other components of the computing system 700.

In some embodiments, the computing system 700 also includes the input device 714 and the output device 716 depicted in FIG. 7. An input device 714 includes any device or group of devices suitable for receiving visual, auditory, or other suitable input that controls or affects the operations of the processor 702. Non-limiting examples of the input device 720 include a touchscreen, a mouse, a keyboard, a microphone, a separate mobile computing device, etc. An output device 716 includes any device or group of devices suitable for providing visual, auditory, or other suitable sensory output. Non-limiting examples of the output device 716 include a touchscreen, a monitor, a speaker, a separate mobile computing device, etc.

Although FIG. 7 depicts the input device 714 and the output device 716 as being local to the computing system 700 that executes the program code 706, other implementations are possible. For instance, in some embodiments, one or more of the input device 714 and the output device 716 includes a remote client-computing device that communicates with the computing system 700 via the network interface device 712 using one or more data networks described herein. In some embodiments, the presentation device 110 comprises the output device 716 and/or the input device 714 and is communicatively coupled to the computing system 700 via the network interface 712.

Figure 8:
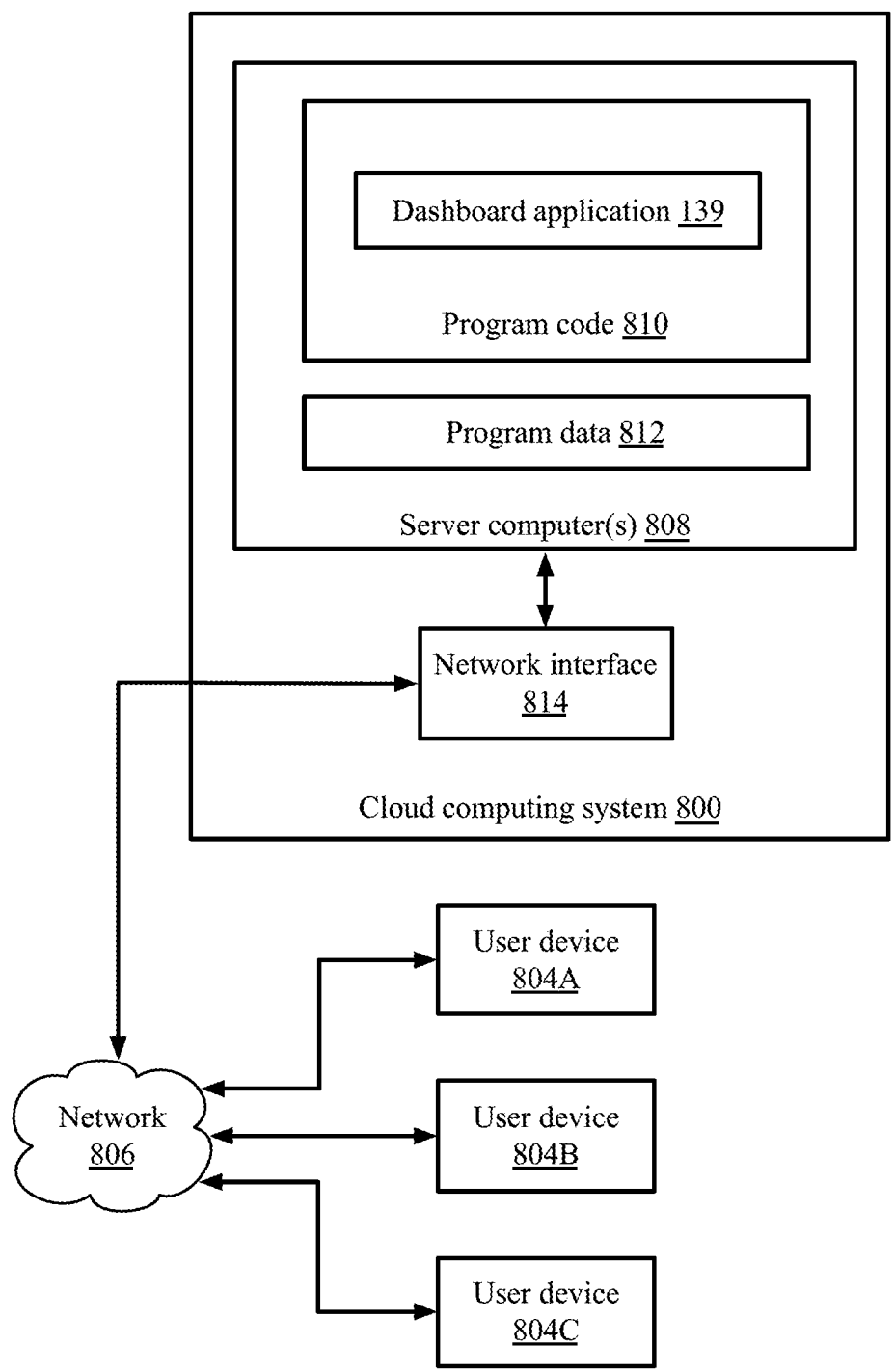
FIG. 8 depicts an example of a cloud computing system that performs certain operations described herein, according to certain embodiments described in the present disclosure.

In some embodiments, the functionality provided by computer system 700 is offered as cloud services by a cloud service provider. For example, FIG. 8 depicts an example of a cloud computer system 800 offering the visualization application 139 that is used by a number of user subscribers including user subscribers using user devices 804A, 804B, and 804C across a data network 806. In the example, the visualization application 139 is offered under a Software as a Service (SaaS) model. One or more users subscribe to the next event prediction and dynamic clustering service, and the cloud computer system 800 performs one or more functions of visualization application 139 for subscribers. For example, the cloud computer system 800 performs services including one or more of steps or functions illustrated in FIGS. 2-4, 6 and described herein. The cloud computer system 800 includes one or more remote server computers 808.

The remote server computers 808 include any suitable non-transitory computer-readable medium for storing program code 810 (e.g., the visualization application 139) and program data 812, or both, which is used by the cloud computer system 800 for providing the cloud services. A computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device reads instructions. The instructions include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 808 include volatile memory, non-volatile memory, or a combination thereof.

One or more of the server computers 808 execute the program code 510 that configures one or more processors of the server computers 808 to perform one or more of the operations that provide one or more methods described herein (e.g., the methods of FIGS. 2-4, 6 described herein). As depicted in the embodiment in FIG. 8, the servers implement visualization application 139. Any other suitable systems or subsystems that perform one or more operations described herein (e.g., one or more development systems for configuring an interactive user interface) are also implemented by the cloud computer system 800.

In some embodiments, the cloud computer system 800 implements the services by executing program code and/or using program data 812, which is resident in a memory device of the server computers 808 or any suitable computer-readable medium and is executed by the processors of the server computers 808 or any other suitable processor.

In some embodiments, the program data 812 includes one or more datasets and models described herein. Examples of these datasets include training data. In some embodiments, one or more of data sets, models, and functions are stored in the same memory device. In additional or alternative embodiments, one or more of the programs, data sets, models, and functions described herein are stored in different memory devices accessible via the data network 806. The cloud computer system 800 also includes a network interface device 814 that enable communications to and from cloud computer system 800. In some embodiments, the network interface device 814 includes any device or group of devices suitable for establishing a wired or wireless data connection to the data networks 806.

Non-limiting examples of the network interface device 814 include an Ethernet network adapter, a modem, and/or the like. The next event prediction and dynamic clustering service is able to communicate with the user devices 804A, 804B, and 804C via the data network 806 using the network interface device 814.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The examples of systems, methods, and acts described in the embodiments presented previously are illustrative, and, in alternative embodiments, certain acts can be performed in a different order, in parallel with one another, omitted entirely, and/or combined between different embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method that includes performing, with one or more processing devices, operations comprising:
   generating a first feature vector from statistics of a first set of values for a first variable of a data set having a plurality of variables, a second feature vector from statistics of a second set of values for a second variable of the data set, and a third feature vector from statistics of a third set of values for a third variable of the data set;
   generating a variable similarity graph comprising nodes connected by links, wherein the nodes represent the first variable, the second variable, and the third variable, respectively, and the links have similarity values representing degrees of similarity among the first feature vector, the second feature vector, and the third feature vector;
   generating, for display on a display device, a user interface to include a first field for selection of a primary variable of the data set and a second field for selection of a secondary variable of the data set;
   updating, for display on the display device, the user interface to include, for display adjacent to the second field, a contextual menu limited to recommended secondary variables for use with the first variable, wherein updating the user interface comprises:
      receiving, via the first field of the user interface, a selection of the first variable;
      detecting, via the user interface, a selection of the second field;
      identifying a relationship between the first field and the second field for generating a visual representation; and
      generating, based on the detection and the relationship, the contextual menu limited to recommended secondary variables by at least (a) including the second variable in the contextual menu based on a similarity value of a link between a pair of nodes representing the first and second feature vectors and (b) excluding the third variable from the contextual menu based on a similarity of a link between a pair of nodes representing the first and third feature vectors.

2. The method of claim 1, further comprising:
   generating a fourth feature vector from statistics of a fourth set of values for a fourth variable of the data set, wherein the nodes of the variable similarity graph further represent the fourth variable and the links have similarity values representing degrees of similarity among the first feature vector, the second feature vector, the third feature vector, and the fourth feature vector;
   determining that the second variable has a higher similarity value in a link between a pair of nodes representing the selected first variable and the second variable as compared to a similarity value in a link between a pair of nodes representing the selected first variable and the fourth variable;

including, in the contextual menu, the fourth variable ranked below the second variable based on the second variable having the higher similarity value.

3. The method of claim 2, further comprising excluding the third variable from the contextual menu based on the link between the pair of nodes representing the first and third feature vectors being excluded from the variable similarity graph.

4. The method of claim 1, wherein generating the variable similarity graph comprises:
identifying, in historical variable pairing data, a co-incidence frequency for a pair of variables comprising the first variable and a secondary variable;
modifying a similarity value of a link between the pair of nodes in accordance with the co-incidence frequency, wherein a higher link similarity value indicates a first co-incidence frequency being greater than a second co-incidence frequency indicated by a lower link similarity value.

5. The method of claim 1, further comprising:
identifying, in a user selection history, a co-selection frequency for a pair of variables comprising the first variable and a second variable;
modifying a similarity value of a link between the pair of nodes in accordance with the co-selection frequency, wherein a higher link similarity value indicates a first co-selection frequency being greater than a second co-selection frequency indicated by a lower link similarity value.

6. The method of claim 1, further comprising determining a similarity value for a link between a first node representing the first variable and a second node representing the first variable, the similarity value indicating a similarity between the first variable and the second variable, wherein determining the similarity value comprises applying, to the first feature vector and the second feature vector, one or more of a radial basis function, a polynomial kernel function, or other similarity function.

7. The method of claim 1, wherein statistics for a set of values in the data set comprise one or more of a number of unique values in the set of values, a density of the set of values, a mean of the set of values, and a median of the set of values.

8. The method of claim 1, further comprising:
updating, for display on the display device, the user interface to include the contextual menu;
receiving, via the user interface, a selection of a particular secondary variable in the contextual menu;
displaying, via the user interface, the selected particular secondary variable in the second field; and
generating, using the data set, an output of the visual representation based at least upon the selected first variable and the particular secondary variable.

9. A computing system, comprising:
receiving, via a first field of a user interface, a selection of a first variable;
means for generating a menu in which interface elements for selecting secondary variables are configured based on relevance of the secondary variables to the first variable; and
updating, for display on a display device, the user interface to include the menu adjacent to a second field of the user interface.

10. The computing system of claim 9, wherein the means for generating the menu comprises processing hardware configured for:
generating a variable similarity graph comprising nodes connected by links, wherein the nodes represent a first variable, a second variable, and a third variable, respectively, and the links have similarity values representing degrees of similarity among a first feature vector representing statistics of a first value set associated with the first variable, a second feature vector representing statistics of a second value set associated with the second variable, and a third feature vector representing statistics of a third value set associated with the third variable;
determining that the second variable has a higher similarity value in a link between a pair of nodes representing the selected first variable and the second variable as compared to a similarity value in a link between a pair of nodes representing the selected first variable and the third variable;
including, in the contextual menu, the third variable ranked below the second variable based on the second variable having the higher similarity value.

11. The computing system of claim 10, wherein the means for generating the contextual menu further comprises processing hardware configured for:
generating a fourth feature vector from statistics of a fourth set of values for a fourth variable, wherein the nodes of the variable similarity graph further represent the fourth variable and the links have similarity values representing degrees of similarity among the first feature vector, the second feature vector, the third feature vector, and the fourth feature vector
excluding a link between a pair of nodes representing the first and fourth feature vectors from the variable similarity graph based on determining that the link between the pair of nodes representing the first and fourth feature vectors comprises a similarity value less than a threshold similarity value.

12. The computing system of claim 11, wherein the means for generating the contextual menu comprises processing hardware configured for excluding the fourth variable from the contextual menu based on the link between the pair of nodes representing the first and fourth feature vectors being excluded from the variable similarity graph.

13. The computing system of claim 10, wherein the means for generating the contextual menu further comprises processing hardware configured for:
identifying, in historical variable pairing data, a co-incidence frequency for a pair of variables comprising the first variable and a secondary variable;
modifying a similarity value of a link between the pair of nodes in accordance with the co-incidence frequency, wherein a higher link similarity value indicates a first co-incidence frequency being greater than a second co-incidence frequency indicated by a lower link similarity value.

14. The computing system of claim 10, wherein the means for generating the contextual menu further comprises processing hardware configured for:
determining the similarity value for the link between the pair of nodes representing the selected first variable and the second variable, by at least applying, to the first feature vector and the second feature vector, one or more of a radial basis function, a polynomial kernel function, or other similarity function, wherein the similarity value indicates a similarity between the first variable and the second variable.

15. A non-transitory computer-readable medium having instructions stored thereon, the instructions executable by a processing device to perform operations comprising:
  generating a variable similarity graph comprising nodes connected by links, wherein the nodes represent a first variable, a second variable, and a third variable of a data set, respectively, and the links have similarity values representing degrees of similarity among a first feature vector associated with the first variable, a second feature vector associated with the second variable, and a third feature vector associated with the third variable;
  generating, for display on a display device, a user interface to include a first field for selection of a primary variable of the data set and a second field for selection of a secondary variable of the data set;
  updating, for display on the display device, the user interface to include, for display adjacent to the second field, an interface element identifying recommended secondary variables for use with the first variable, wherein updating the user interface comprises:
    receiving, via the first field of the user interface, a selection of the first variable;
    detecting, via the user interface, a selection of the second field;
    identifying a relationship between the first field and the second field for generating a visual representation; and
    generating, based on the detection and the relationship, the interface element of recommended secondary variables by at least (a) configuring the interface element to include the second variable in an upper portion of the interface element based on a similarity value of a link between a pair of nodes representing the first and second feature vectors and (b) configuring the interface element to exclude an interface element for selecting the third variable from the upper portion of the interface element based on a similarity value of a link between a pair of nodes representing the first and third feature vectors.

16. The non-transitory computer-readable medium of claim 15, the operations further comprising generating the first feature vector from statistics of a first set of values for the first variable of the data set, the second feature vector from statistics of a second set of values for the second variable of the data set, and the third feature vector from statistics of a third set of values for the third variable of the data set.

17. The non-transitory computer-readable medium of claim 16, the operations further comprising:
  generating a fourth feature vector from statistics of a fourth set of values for a fourth variable of the data set, wherein the nodes of the variable similarity graph further represent the fourth variable and the links have similarity values representing degrees of similarity among the first feature vector, the second feature vector, the third feature vector, and the fourth feature vector, and
  determining that the second variable has a higher similarity value in a link between a pair of nodes representing the selected first variable and the second variable as compared to a similarity value in a link between a pair of nodes representing the selected first variable and the fourth variable;
  including, in the interface element, the fourth variable ranked below the second variable based on the second variable having the higher similarity value.

18. The non-transitory computer-readable medium of claim 16, the operations further comprising:
  identifying, in historical variable pairing data, a co-incidence frequency for a pair of variables comprising the first variable and a secondary variable; and
  modifying a similarity value of a link between the pair of nodes in accordance with the co-incidence frequency, wherein a higher link similarity value indicates a first co-incidence frequency being greater than a second co-incidence frequency indicated by a lower link similarity value.

19. The non-transitory computer-readable medium of claim 16, the operations further comprising determining a similarity value for a link between a first node representing the first variable and a second node representing the first variable, the similarity value indicating a similarity between the first variable and the second variable, wherein determining the similarity value comprises applying, to the first feature vector and the second feature vector, one or more of a radial basis function, a polynomial kernel function, or other similarity function.

20. The non-transitory computer-readable medium of claim 16, wherein statistics of the first set of values for the first variable of the data set comprise one or more of a number of unique values in the first set of values, a density of the first set of values, a mean of the first set of values, and a median of the first set of values.

* * * * *